Figure 10:
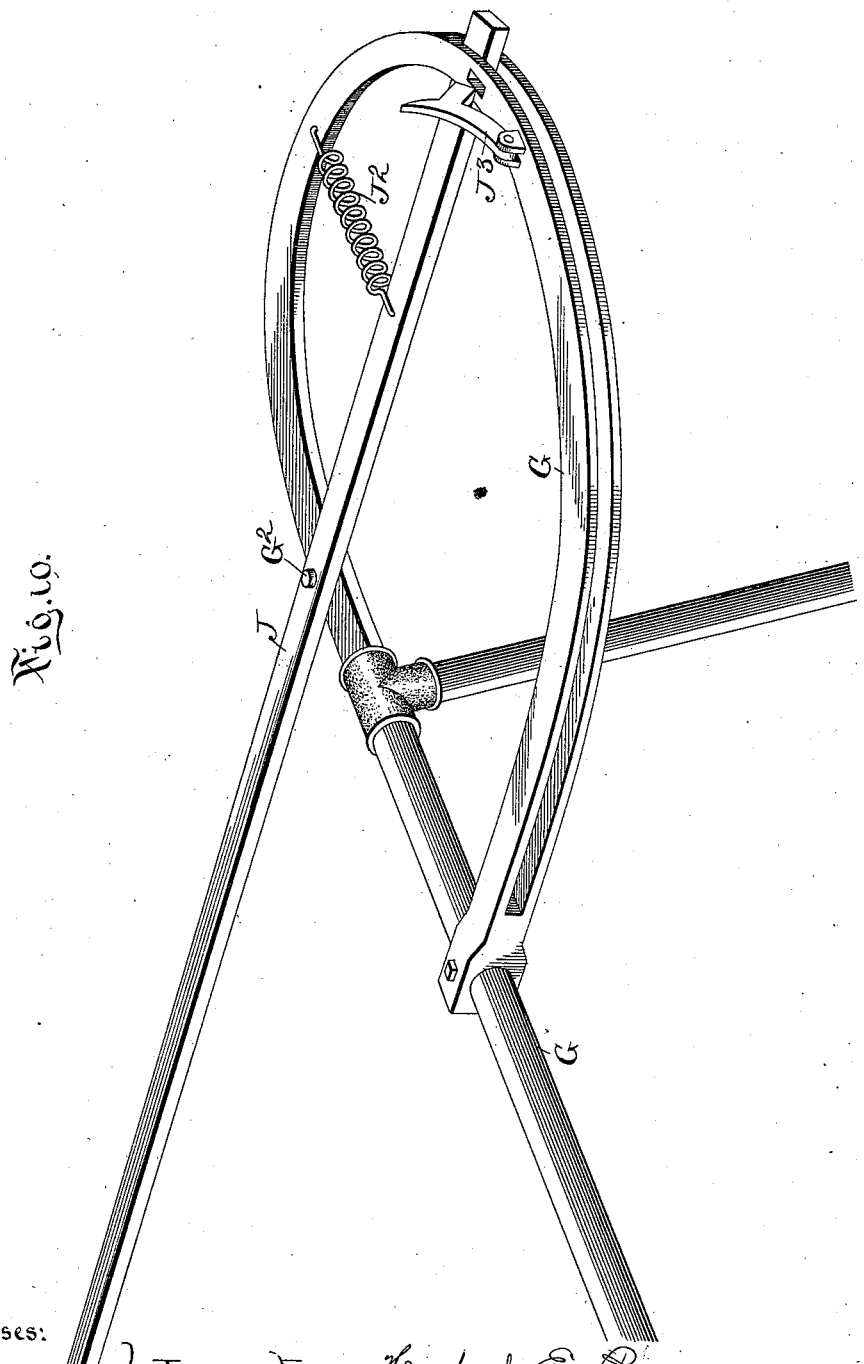

(No Model.) 4 Sheets—Sheet 1.
H. E. POAGE.
CORN HARVESTER AND SHOCKER.
No. 545,534. Patented Sept. 3, 1895.
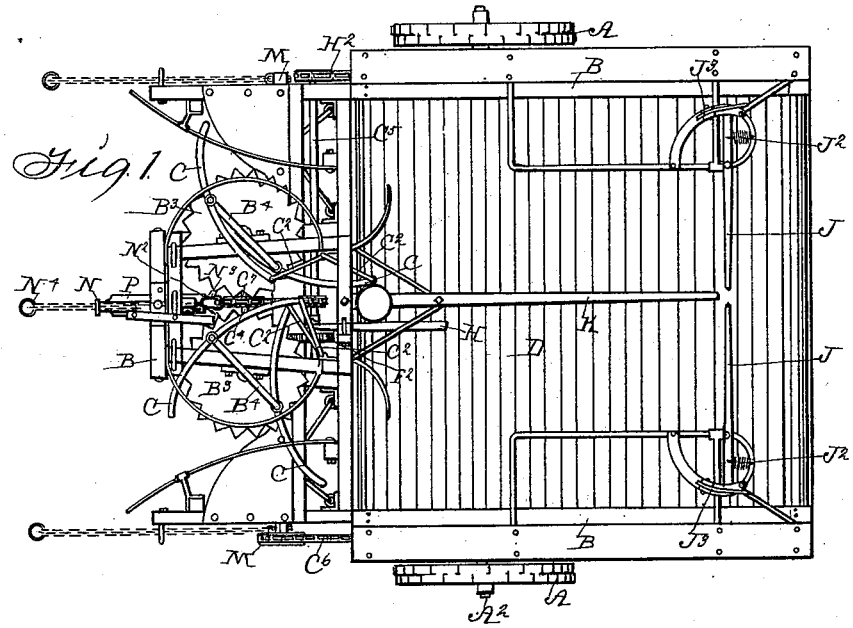
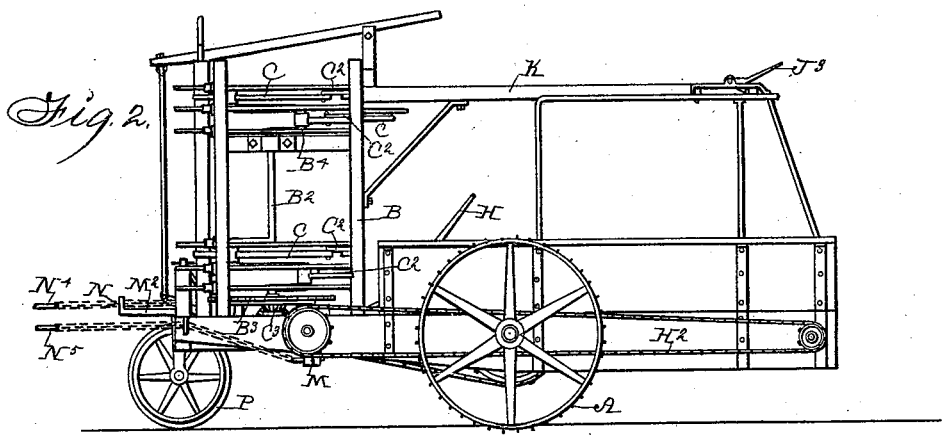
Witnesses: R. H. Orwig, C. F. Wilson
Inventor: Herbert E. Poage,
By Thomas G. Orwig, Attorney

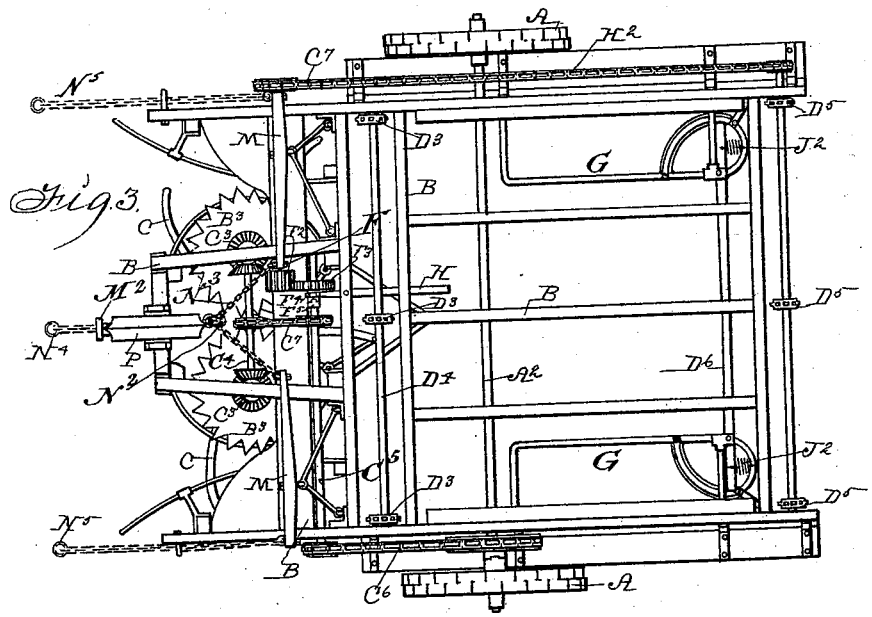

(No Model.) 4 Sheets—Sheet 3.
H. E. POAGE.
CORN HARVESTER AND SHOCKER.
No. 545,534. Patented Sept. 3, 1895.
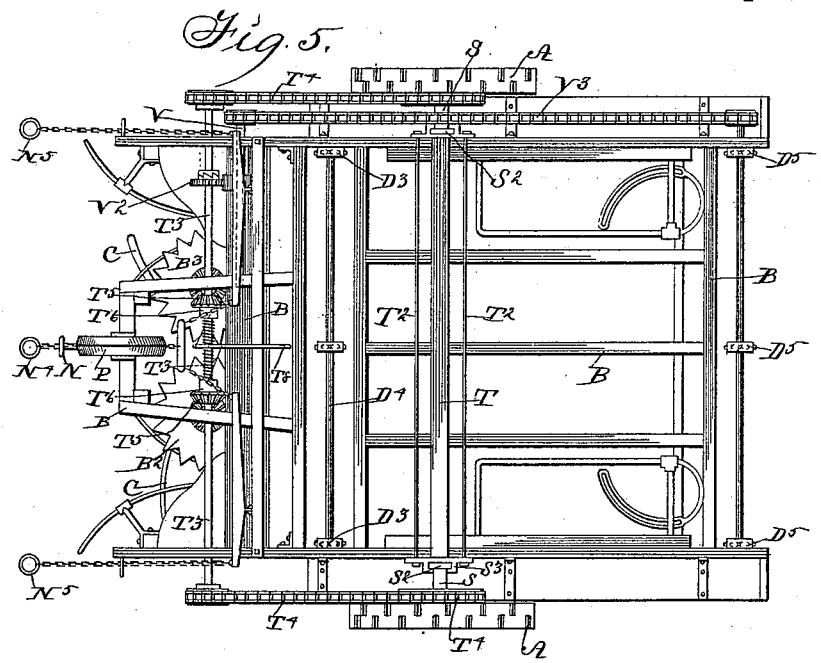
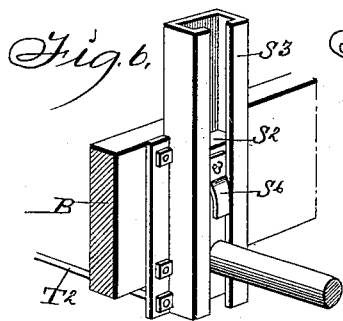
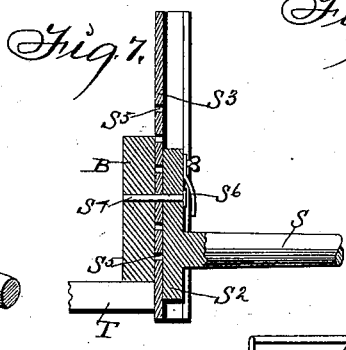
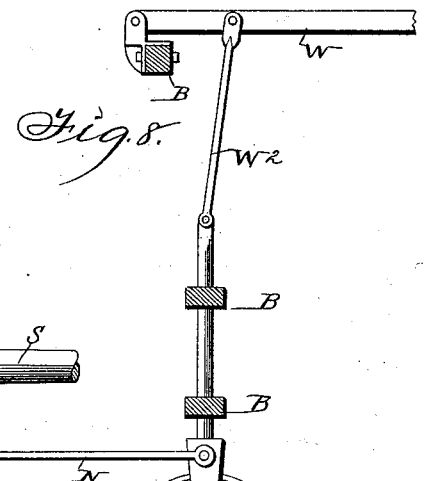
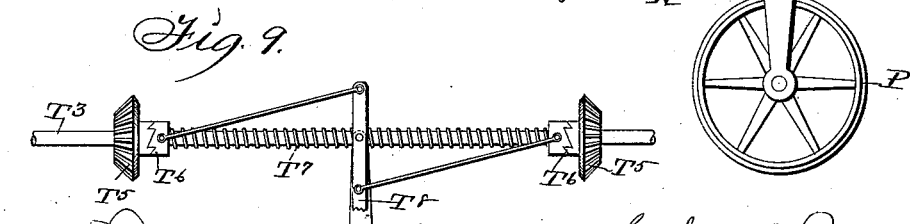
Witnesses:
W. J. Sankey.
R. H. Orwig.
Inventor: Herbert E. Poage,
By Thomas G. Orwig, Attorney.

(No Model.) 4 Sheets—Sheet 4.

H. E. POAGE.
CORN HARVESTER AND SHOCKER.

No. 545,534. Patented Sept. 3, 1895.

Witnesses:
W. J. Sankey.
R. G. Orwig.

Inventor: Herbert E. Poage,
By Thomas G. Orwig, Attorney.

UNITED STATES PATENT OFFICE.

HERBERT E. POAGE, OF NEWTON, IOWA.

CORN HARVESTER AND SHOCKER.

SPECIFICATION forming part of Letters Patent No. 545,534, dated September 3, 1895.

Application filed October 2, 1894. Serial No. 524,768. (No model.)

*To all whom it may concern:*

Be it known that I, HERBERT E. POAGE, a citizen of the United States of America, residing at Newton, in the county of Jasper and State of Iowa, have invented certain new and useful Improvements in Corn Harvesters and Shockers, of which the following is a specification.

The objects of my invention are, first, to provide simple, cheap, and durable mechanism for engaging and straightening the cornstalks and passing them backwardly after they are severed and holding them in an upright position, so that a person on the machine may conveniently receive and hold the cornstalks.

A further object is to provide improved means for holding the stalks in an upright position upon the machine-platform, when they may be tied, and in providing means whereby the shocks may be automatically placed in an upright position in the field, and, further, to provide improved means for steering machines of this class to pass between the rows of corn or the like.

With these objects in view my invention consists in certain details of construction, arrangement, and combination of parts, as hereinafter set forth, pointed out in my claims, and illustrated in the accompanying drawings, in which—

Figure 1 is a top or plan view of the complete machine. Fig. 2 is a side elevation of the same. Fig. 3 is a bottom view of the machine with the platform removed. Fig. 4 is a vertical sectional view through the line $x\ x$ of Fig. 1. Fig. 5 is an inverted plan view of my machine, showing a slightly-modified form. Fig. 6 is an enlarged detail perspective view of one of the adjustable bearings of the machine. Fig. 7 is a sectional view of the same. Fig. 8 is a detail view showing the means for adjusting the forward end of the machine-frame vertically. Fig. 9 is a detail view showing the means for throwing the cutting mechanism in and out of gear. Fig. 10 is a detail perspective view showing one of the devices for supporting the horizontal arms at the rear of the machine.

Referring to the accompanying drawings, the reference-letter A is used to designate the traction-wheels of the device; $A^2$, the rotatable axle of the same. B designates the frame of the machine mounted upon said axle.

In the forward end of the machine are located the two vertical shafts $B^2\ B^2$ in suitable bearings that will permit of their rotation. $B^3$ designates the circular cutter-knives fixed to the shafts B and adapted to rotate therewith in in a horizontal plane to cut two rows of cornstalks as the machine is advanced. The said shafts $B^2 B^2$ have the crank-arms $B^4$ formed therein and extended in opposite directions. C designates curved arms pivotally attached to said crank-arms, and $C^2$ are links pivoted to suitable stationary supports and to said curved arms. This mechanism is of the same construction usually employed in harvesters for packing the grain into the receptacles in which it is tied into sheaves, and is used in the present instance for the purpose of engaging the cornstalks and holding them in an upright position while being severed and for carrying them rearwardly in a vertical position. The ends of the said arms describe an approximate ellipse, first being projected inwardly to engage the corn and when at the rear end of their stroke drawn outwardly to disengage the corn.

The shafts $B^2\ B^2$ are rotated by power derived from the traction-wheels, as follows: $C^3$ designates bevel gear-wheels fixed to the lower ends of the shafts $B^2\ B^2$. $C^4$ is a shaft having bevel gear-wheels fixed to its ends in mesh with the aforesaid gears. $C^5$ is a rotatable shaft mounted in a suitable part of the machine-frame and driven when the machine is in motion by means of a sprocket-chain $C^6$, and a similar chain $C^7$ serves to impart motion from said shaft to the shaft $C^4$.

Upon the body of the machine is mounted a moving platform D, arranged to run from a point immediately in the rear of the cutting-knives to the end of the machine. The platform is carried upon sprocket-chains $D^2$, that pass over the sprockets $D^3$, fixed to the shaft $D^4$ at the front of the machine, and the sprockets $D^5$, fixed to the shaft $D^6$ at the rear of the machine. Motion is applied to this platform from the traction-wheels, as follows: F designates a shaft rotatably mounted in the forward end of the machine in proximity to the shaft $C^5$, and a cog-wheel $F^2$ on said shaft is normally in mesh with a large spur-wheel F³, slidingly mounted on the shaft C⁵. Said wheel F² is of a greater thickness than the wheel F³, so that said latter wheel may be moved on its shaft without being disengaged from the former wheel. A clutch F⁴ is fixed to the wheel F³ and adapted to engage a mating-clutch F⁵, fixed to the shaft C⁵, and a lever H is arranged so that said clutches may be readily placed in engagement with each other and the platform operated. A sprocket-chain H² connects the shaft F with the shaft at the rear end of the machine to drive the platform.

G indicates a guide fixed to the machine-frame extended upwardly and inwardly and then horizontally rearward and having its rear end bent in the form of a circle and secured to the horizontal part thereof. Said curved part is slotted horizontally, and an arm J is pivoted in said guide at G² with its one end projecting horizontally inward to a point near the central portion of the machine and its other end admitted in said slotted guide to hold it in a horizontal position and allow it to move forwardly. J² is a contractile coil-spring attached to the arm J and guide G to normally hold the inner end of said arm to its forward limit. J³ indicates a gravity-pawl pivoted at one end on top of the guide G and having a downward projection adapted to engage the outer end of the arm J and prevent it from moving forwardly. It may be elevated by hand to release the arm and the inner end of the arm be permitted to swing rearwardly when pressed against by the shock of corn. After the shock is dropped on the ground-surface the contractile spring returns the arm J to its normal position at right angles to the machine-frame. A like device is located on each side of the machine. K designates a rigid arm projecting rearwardly from the front of the machine, in the approximate central portion thereof, to support the cornstalks in a vertical position.

In practical use the corn is severed by the cutting-knives and passed backwardly by the arms C when the machine is advanced. The operator is stationed upon the platform and receives the corn and stands it in an upright position, resting upon the arms J and K. When enough of the stalks have been accumulated to form a shock, they are tied by the operator and the gravity-latches J³ elevated and the lever H moved to set the platform in motion. This, it will be seen, will carry the shock rearwardly and place it in an upright position in the field.

The steering mechanism comprises the two singletrees M, pivoted to suitable supports, and a lever M², extended forwardly from the central portion of the machine and having a loop N in its forward end and a pulley N² attached to the rear end. N³ is a chain attached to the inner ends of the singletrees and passing through said pulleys N², and N⁴ is a chain connected therewith and passed forwardly through said loop. N⁵ are chains extended forwardly from the outer ends of the aforesaid singletrees. The draft-animals are hitched to the forward ends of said chains, and it will be obvious that when they are turned to one side the lever M² will also turn by reason of the pressure of the chain upon its outer end, the caster or steering wheel P being connected with the said lever by having the shaft of the former fixed to the lever, so that the caster-wheel will turn with the lever.

In the modified form shown in Fig. 5 the axle A² is dispensed with and a stub-axle S provided for each of the traction-wheels. These axles are fixed to the vertically-movable blocks S² in the boxings S³, which are fixed to the machine-frame. S⁴ indicates a bolt adapted to be passed through each of the blocks S² and through one of the openings S⁵ in the boxing S³ to thereby adjust the height of the frame relative to the ground-surface. S⁶ indicates a plate detachably connected with the block S² to cover the head of the bolt S⁴ and prevent its accidental displacement. T indicates a wooden brace extended transversely of the machine-frame between the boxings, and T² are rods connected with the boxings to strengthen the frame. T³ indicates a shaft extended transversely of the machine at its forward end, adapted to be driven by the sprocket-gears T⁴ from each axle and geared to the cutter-knives by the bevel-gears T⁵. T⁶ indicates clutch devices by which the said gears are normally held in gear with the shaft T³ by means of the springs T⁷, and which may be thrown out of engagement by means of the lever T⁸. V indicates an auxiliary shaft geared to the shaft T³ by means of the gears V² and geared to the shaft at the rear of the machine over which the endless carrier passes by means of the sprocket-chain V³. Means are also provided for vertically adjusting the frame relative to the caster-wheel, as follows: W indicates a lever connected to the top of the standard of the caster-wheel by means of a link W². Its forward end is pivotally mounted on a part of the machine-frame and its rear end may be held by any suitable means in any position, the said upright of the caster-wheel being slidingly connected with the frame to permit of this.

Having thus described my invention, what I claim as new therein, and desire to secure by Letters Patent of the United States therefor, is—

1. The combination with a corn harvester having an endless platform adapted to receive corn stalks in an upright position and be moved rearwardly to deposit the shock on the ground surface, of a guide fixed to one side of the machine frame projecting upwardly and inwardly and rearwardly and having its rear end curved outwardly and forwardly and slotted horizontally an arm pivoted near its central portion in said guide with its outer end in said slot, a contractile spring attached to the outer end portion of said arm and to said guide, and a gravity latch mounted on said guide to engage the said arm, substantially as and for the purposes stated.

2. In an improved corn harvester the combination of an endless platform extended horizontally and adapted to receive corn stalks in an upright position, means for rotating said platform by power derived from the traction wheels of the device, means for controlling the movement of the platform, an arm supported above the central portion of the platform and extended rearwardly, two guides at opposite sides of the machine frame, an arm pivoted in each end extended inwardly, a coil spring for holding its end forwardly and a pawl for preventing said end from moving rearwardly, all arranged and combined, substantially as and for the purposes stated.

HERBERT E. POAGE.

Witnesses:
G. F. SEEMS,
J. RALPH ORWIG.